United States Patent
Liu et al.

(10) Patent No.: US 11,445,440 B2
(45) Date of Patent: Sep. 13, 2022

(54) BLUETOOTH MESH NETWORK SYSTEM AND CONNECTION METHOD HAVING POWER MANAGEMENT MECHANISM

(71) Applicant: REALTEK SEMICONDUCTOR CORPORATION, Hsinchu (TW)

(72) Inventors: Yong Liu, Suzhou (CN); Shi-Meng Zou, Suzhou (CN); Yang Huang, Suzhou (CN); Bin Shao, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/314,264

(22) Filed: May 7, 2021

(65) Prior Publication Data
US 2021/0392579 A1 Dec. 16, 2021

(30) Foreign Application Priority Data

Jun. 10, 2020 (CN) .......................... 202010524891.6

(51) Int. Cl.
*H04W 52/02* (2009.01)
*H04W 4/80* (2018.01)
(Continued)

(52) U.S. Cl.
CPC ......... *H04W 52/0216* (2013.01); *H04W 4/80* (2018.02); *H04W 76/15* (2018.02); *H04W 76/40* (2018.02); *H04W 84/18* (2013.01)

(58) Field of Classification Search
CPC ... H04W 84/18; H04W 4/80; H04W 52/0216; H04W 76/15; H04W 76/40
See application file for complete search history.

(56) References Cited

U.S. PATENT DOCUMENTS

2020/0029278 A1 1/2020 Mallat
2021/0345082 A1* 11/2021 Li .......................... H04W 84/20

FOREIGN PATENT DOCUMENTS

| CN | 108600892 A | * | 9/2018 | ............... H04R 1/10 |
| CN | 109714745 A | | 5/2019 | |
| WO | WO2020077659 A1 | | 4/2020 | |

OTHER PUBLICATIONS

Yong Liu et al. U.S. Appl. No. 17/193,355, filed Mar. 5, 2021.
OA letter of the counterpart TW application (appl. No. 109122611) dated Mar. 11, 2021.

* cited by examiner

Primary Examiner — Tuan H Nguyen
(74) Attorney, Agent, or Firm — WPAT, PC

(57) ABSTRACT

The present disclosure discloses a Bluetooth mesh network system having power management mechanism that includes low power nodes and a friend node. The friend node operates a part of the low power nodes under a first connection mode to establish a one-to-one connection with the friend node under a connection protocol. The friend node operates the other part of the low power nodes under a second connection mode to establish a many-to-one connection based on a broadcast protocol. The friend node sets a mode operation time threshold value and accumulates a mode connection time for each of the low power nodes. When the mode connection time of one of the low power nodes that operates under one of the first connection mode and the second connection mode reaches the corresponding mode operation time threshold value, the one of the low power nodes switches to operate under the other one of the first connection mode and the second connection mode.

8 Claims, 2 Drawing Sheets

(51) Int. Cl.
*H04W 76/40* (2018.01)
*H04W 76/15* (2018.01)
*H04W 84/18* (2009.01)

BLUETOOTH MESH NETWORK SYSTEM AND CONNECTION METHOD HAVING POWER MANAGEMENT MECHANISM

BACKGROUND OF THE INVENTION

1. Field of the Invention

The present disclosure relates to a Bluetooth mesh network system and a Bluetooth mesh network system connection method having power management mechanism.

2. Description of Related Art

In recent years, the application requirements of smart home, smart building and smart factory increase a lot due to the development of Internet of Things (IoT). Bluetooth, which is a low power dissipation communication technology, thus becomes more and more important. Bluetooth Special Interest Group (SIG) wishes to implement multiple-to-multiple communication function through Bluetooth mesh network technology to provide a longer transmission distance and boost the IoT market.

In Bluetooth mesh network, low power nodes are the nodes that do not have steady power supply and have to maintain low power dissipation for a long time. If an efficient power management mechanism is absent, the power dissipation among different low power nodes may not be average under some usage scenarios such that the life of a part of the low power nodes in a system is shortened.

SUMMARY OF THE INVENTION

In consideration of the problem of the prior art, an object of the present disclosure is to provide a Bluetooth mesh network system and a connection method having power management mechanism.

The present disclosure discloses a Bluetooth mesh network system having power management mechanism that includes a plurality of low power nodes (LPN) and a friend node. The friend node is configured to operate a part of the low power nodes in a first connection mode to establish a one-to-one connection with the friend node based on a connection protocol, operate the other part of the low power nodes in a second connection mode to establish a multiple-to-one connection with the friend node based on a broadcast protocol and set a mode operation time threshold value for each of the low power nodes and accumulating a respective mode connection time for each of the low power nodes. When the mode connection time that the low power nodes operate in one of the first connection mode and the second connection mode reaches the corresponding mode operation time threshold value, the low power nodes switches to operate in the other one of the first connection mode and second connection mode.

The present disclosure also discloses a Bluetooth mesh network system connection method having power management mechanism used in a Bluetooth mesh network system that includes the steps outlined below. A part of a plurality of low power nodes are operated in a first connection mode by a friend node, to establish a one-to-one connection with the friend node based on a connection protocol. The other part of the low power nodes are operated in a second connection mode by the friend node, to establish a multiple-to-one connection with the friend node based on a broadcast protocol. A mode operation time threshold value is set for each of the low power nodes and a respective mode connection time is accumulated for each of the low power nodes by the friend node. The low power nodes are switched to operate in the other one of the first connection mode and the second connection mode when the mode connection time that the low power nodes operate in one of the first connection mode and the second connection mode reaches the corresponding mode operation time threshold value.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a Bluetooth mesh network system and a Bluetooth mesh network system connection method having power management mechanism to perform management on the operation time of connection modes of the lower power nodes such that an average power dissipation of the different low power nodes can be the same.

Figure 1:
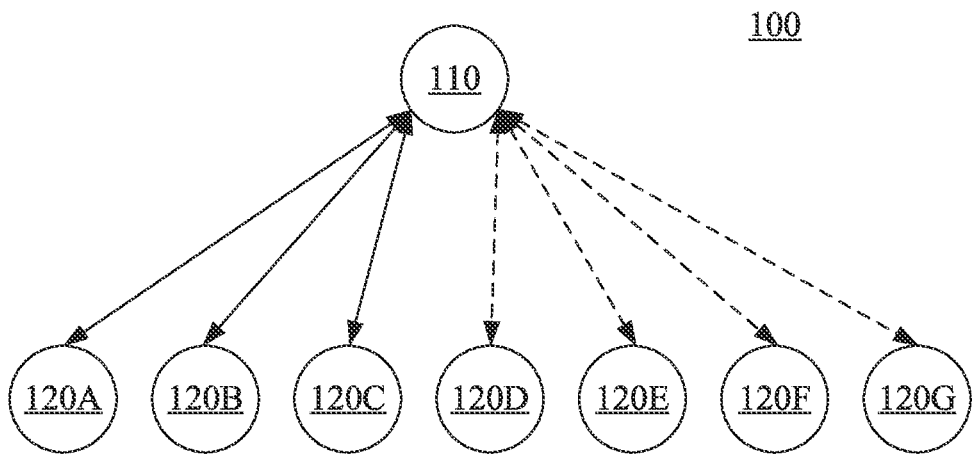
FIG. 1 illustrates a diagram of a Bluetooth mesh network system having power management mechanism according to an embodiment of the present invention.

Reference is now made to FIG. 1. FIG. 1 illustrates a diagram of a Bluetooth mesh network system 100 having power management mechanism according to an embodiment of the present invention. The Bluetooth mesh network system 100 includes a friend node 110 and low power nodes 120A~120G. The friend node 110 and the low power nodes 120A~120G can perform communication through Bluetooth mesh network protocol.

In an embodiment, the friend node 110 has a steady power supply and is able to keep operating in a wake-up state. On the contrary, each of the low power nodes 120A~120G has an unstable power supply, e.g. battery. The low power nodes 120A~120G thus have to operate in a sleep state for a long time. The low power nodes 120A~120G only switch to the wake-up state for a very short time period when necessary and have to switch back to the sleep state soon to maintain a low power dissipation. In an embodiment, the low power nodes 120A~120G can switch to the wake-up state from the sleep state periodically based on a pre-scheduled time interval.

In an embodiment, the friend node 110 can perform connection in different connection modes with each of the low power nodes 120A~120G. For example, the friend node 110 can selectively perform one-to-one connection with each of the low power nodes 120A~120G in a first connection mode, or perform multiple-to-one connection with each of the low power nodes 120A~120G in a second connection mode.

In the first connection mode, the friend node 110 can establish one-to-one connection (illustrated by solid lines) with each of the low power nodes 120A~120C based on a specific connection protocol through such as, but not limited to a generic attribute profile bearer (GATT bearer). In an embodiment, such a connection protocol can be such as, but not limited to a proxy protocol.

Under the connection protocol described above, the friend node 110 is configured to operate as a connection server to perform periodic connection server broadcast (not illustrated). Under the connection protocol described above, each of the low power nodes 120A~120C is configured to operate as a connection client to establish the connection with the friend node 110 based on the connection protocol when the low power nodes 120A~120C receive and identify the connection server broadcast.

In an embodiment, the friend node 110 supports a relay node function. As a result, the friend node 110 can filter out invalid packets that are unrelated to the low power nodes 120A~120C and store at least one valid packet that is related to the low power nodes 120A~120C. When the low power nodes 120A~120C switch from the wake-up state from the sleep state, the friend node can transmit the valid packets to the low power nodes 120A~120C.

In the second connection mode, the friend node 110 can establish multiple-to-one connection (illustrated by dashed lines) with each of the low power nodes 120A~120C based on a broadcast protocol by using broadcast and scanning through such as, but not limited to an advertising bearer.

Under such a communication method, the low power nodes 120D~120G scan and receive related and invalid packets in the wake-up state. In other words, the friend node 110 does not perform packet-filtering for the low power nodes 120D~120G. The low power nodes 120D~120G not only receive the valid packets but also receive invalid packets.

In the first connection mode, since the friend node 110 spends more resource on the processing of the packets, the low power nodes 120A~120C dissipate less power. In the second connection mode, the friend node 110 does not perform the processing of the packet such that the low power nodes 120D~120G dissipate higher power.

In an embodiment, the low power nodes 120A~120G operate in the first connection mode in an initialization stage. However, the friend node 110 cannot perform one-to-one connection with all of the low power nodes 120A~120G in a normal operation state since the resource is limited. As a result, the friend node 110 has a maximum supported one-to-one connection number.

More specifically, the number of the low power nodes that are allowed to operate in the first connection mode does not exceed the maximum supported one-to-one connection number of the friend node 110. Aa result, when the number of the low power nodes operate in the first connection mode exceeds the maximum supported one-to-one connection number, the friend node 110 controls the part of the low power nodes that exceed the maximum supported one-to-one connection number to operate in the second connection mode.

In the embodiments described above, when the maximum supported one-to-one connection number is 3, the friend node 110 only allows three of the low power nodes 120A~120C to operate in the first connection mode to perform one-to-one connection. The other four of the low power nodes 120D~120G are allowed to operate in the second connection mode to perform multiple-to-one connection.

The friend node 110 further sets a mode operation time threshold value for each of the low power nodes 120A~120G and accumulates a respective mode connection time for each of the low power nodes.

When the mode connection time that the low power nodes 120A~120G operate in one of the first connection mode and the second connection mode reaches the corresponding mode operation time threshold value, the low power nodes 120A~120G switches to operate in the other one of the first connection mode and the second connection mode.

More specifically, when the mode connection time that the low power nodes 120A~120C operate in the first connection mode reaches the corresponding mode operation time threshold value, the low power nodes 120A~120C switch to operate in the second connection mode. When the mode connection time that the low power nodes 120D~120G operate in the second connection mode reaches the corresponding mode operation time threshold value, the low power nodes 120D~120G switch to operate in the first connection mode.

In an embodiment, the friend node 110 can determine that the mode connection time reaches the mode operation time threshold value and inform the low power nodes 120A~120G to switch the connection mode. In another embodiment, the friend node 110 can set the mode operation time threshold value and inform the low power nodes 120A~120G about the mode operation time threshold value. Each of the low power nodes 120A~120G further determines that the mode connection time reaches the mode operation time threshold value to switch the connection mode.

The friend node 110 can keep setting new mode operation time threshold value for each of the low power nodes 120A~120G, such that the low power nodes 120A~120G switch the connection mode again when the mode connection time of the low power nodes 120A~120G reaches the newly set mode operation time threshold value. As a result, the low power nodes 120A~120G keep operating in the first connection mode and the second connection mode in an interlaced manner such that an average power dissipation of the low power nodes 120A~120G is the same.

In an embodiment, the number of the low power nodes exceeds the maximum supported one-to-one connection number, and the numbers of the low power nodes that operate in the first connection mode and the second connection mode are K and L respectively. In order to make the average power dissipation of the low power nodes the same, the friend node 110 can set an appropriate mode operation time threshold value for each of the low power nodes such that the ratio of time that each of the low power nodes operates in the first connection mode and the second connection mode is K:L.

In an embodiment, the numbers of the low power nodes that operate in the first connection mode and the second connection mode are K and L respectively. The average power dissipation that the low power nodes keep operating in the second connection mode is PA. The average power dissipation that the low power nodes keep operating in the first connection mode is $(1/N) \times PA$. The average power dissipation when each of low power nodes operates in the first and the second connection modes in the interlaced manner according to the ratio of time described above can be expressed by the following equation:

$$PA \times ((K \times (1/N) + L)/(K+L))$$

Figure 2:
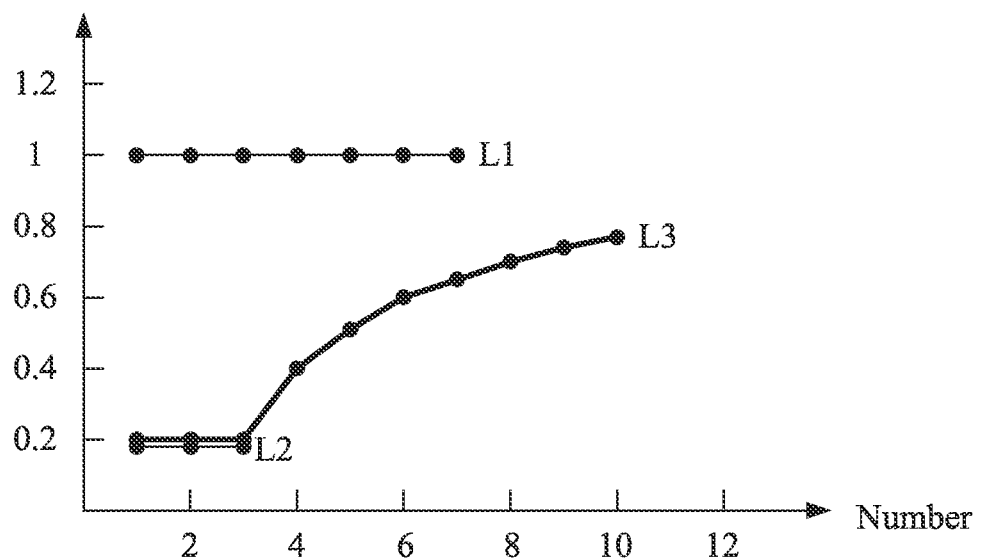
FIG. 2 is a diagram of the average power dissipation of the low power nodes under different operation conditions of the Bluetooth mesh network system according to an embodiment of the present invention.

Reference is now made to FIG. 2. FIG. 2 is a diagram of the average power dissipation of the low power nodes under different operation conditions of the Bluetooth mesh network system 100 according to an embodiment of the present invention. In FIG. 2, X-axis is the number of the low power nodes and the Y-axis is the average power dissipation of the low power nodes. A single unit of the X-axis represents the average power dissipation of a low power node that keeps operating in the second connection mode.

In FIG. 2, the lines L1 and L2 illustrated as thinner lines correspond to the operation conditions that when a part of the low power nodes keep operating in the second connection mode and the other part of the low power nodes keep operating in the first connection mode, in which these low power nodes never switch the connection mode.

The line L3 illustrated as a thicker line corresponds to the operation condition that the low power nodes keep switching between the first and the second connection modes described in the present invention. When the number of the low power nodes does not exceed three, all the low power nodes operate in the first connection mode. When the number of the low power nodes exceeds three, the part of the low power nodes that exceeds three operate in the second connection mode.

As a result, as illustrated in FIG. 2, for the operation condition corresponding to the lines L1 and L2, the low power nodes corresponding to the second connection mode keep operating with a higher average power dissipation (e.g. 1 unit) while the low power nodes corresponding to the first connection mode keep operating with a lower average power dissipation (e.g. 0.2 unit). The average power dissipations between different low power nodes are very different from each other and the life of the low power nodes is greatly affected.

For the operation condition corresponding to the line L3, each of the low power nodes operates with relatively lower average power dissipation. Take the number of low power nodes of 6 as an example, the average power dissipation of each of the low power nodes is 0.6 unit. As a result, different low power nodes have the same average power dissipation and the life of each of the low power nodes can be lengthened in an average way.

In some approaches, the low power nodes keep operating in the same connection mode. However, such a method keeps the low power nodes that operate in the first connection mode having smaller power dissipation and keeps the low power nodes that operate in the second connection mode having larger power dissipation. As a result, the low power nodes that keep operating in the second connection mode dissipates the power faster and the life of these low power nodes is shorter than the life of the low power nodes that keep operating in the first connection mode.

The Bluetooth mesh network system 100 having power management mechanism in the present invention can set the mode operation time threshold value and switch the connection mode of the low power nodes when the mode connection time reaches the mode operation time threshold value. The low power nodes can thus operate in the connection modes having different power dissipation. By using the scheduling mechanism, the average power dissipation of the low power nodes can become the same such that the life thereof can become basically the same.

Figure 3:
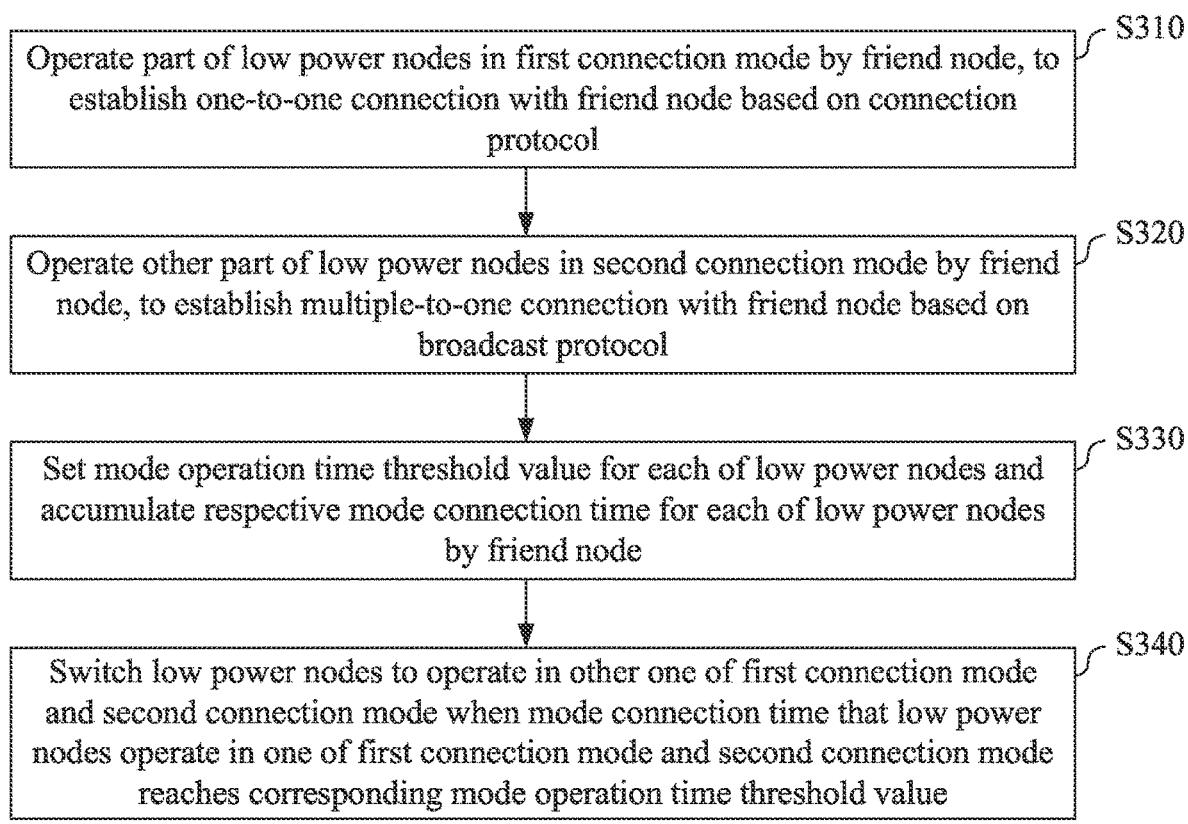
FIG. 3 is a flow chart of a Bluetooth mesh network system connection method having power management mechanism according to an embodiment of the present invention.

Reference is now made to FIG. 3. FIG. 3 is a flow chart of a Bluetooth mesh network system connection method 300 having power management mechanism according to an embodiment of the present invention.

Besides the device described above, the present invention further provides the Bluetooth mesh network system connection method 300 that can be used in such as, but not limited to the Bluetooth mesh network system 100 in FIG. 1. As illustrated in FIG. 3, an embodiment of the Bluetooth mesh network system connection method 300 includes the following steps.

In step S310, a part of the low power nodes, e.g. the low power nodes 120A~120C illustrated in FIG. 1, are operated in the first connection mode by the friend node 110, to establish the one-to-one connection with the friend node 110 based on the connection protocol.

In step S320, the other part of the low power nodes, e.g. the low power nodes 120D~120G illustrated in FIG. 1, are operated in the second connection mode by the friend node, to establish the multiple-to-one connection with the friend node 110 based on the broadcast protocol.

In step S330, the mode operation time threshold value is set for each of the low power nodes 120A~120G and the respective mode connection time is accumulated for each of the low power nodes 120A~120G by the friend node 110.

In step S340, the low power nodes 120A~120G are switched to operate in the other one of the first connection mode and the second connection mode when the mode connection time that the low power nodes 120A~120G operate in one of the first connection mode and the second connection mode reaches the corresponding mode operation time threshold value.

It is appreciated that the embodiments described above are merely an example. In other embodiments, it should be appreciated that many modifications and changes may be made by those of ordinary skill in the art without departing from the spirit of the invention.

In summary, the Bluetooth mesh network system and the connection method having power management mechanism of the present invention can perform scheduling on the connection mode of the low power nodes such that the different low power nodes can have the same average power dissipation.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A Bluetooth mesh network system having power management mechanism, comprising:
   a plurality of low power nodes (LPN); and
   a friend node configured for:
      operating a part of the low power nodes in a first connection mode to establish a one-to-one connection with the friend node based on a connection protocol;
      operating the other part of the low power nodes in a second connection mode to establish a multiple-to-one connection with the friend node based on a broadcast protocol; and
      setting a mode operation time threshold value for each of the low power nodes and accumulating a respective mode connection time for each of the low power nodes;
   wherein when the mode connection time that the low power nodes operate in one of the first connection mode and the second connection mode reaches the corresponding mode operation time threshold value, the low power nodes switches to operate in the other one of the first connection mode and the second connection mode, in which an average power dissipation of each of the low power nodes is the same according to the mode operation time threshold value set by the friend node.

2. The Bluetooth mesh network system of claim 1, wherein the first connection mode is to establish the one-to-one connection between the low power nodes and the friend node based on the connection protocol through a generic attribute profile bearer (GATT bearer), and the connection protocol is a proxy protocol;

the second connection mode is to establish the multiple-to-one connection between the low power nodes and the friend node based on the broadcast protocol through an advertising bearer.

3. The Bluetooth mesh network system of claim 1, wherein a number of the low power nodes that is allowed to be operated in the first connection mode at the same time does not exceed a maximum supported one-to-one connection number of the friend node.

4. The Bluetooth mesh network system of claim 3, wherein the low power nodes operate in the first connection mode in an initialization stage; and when a number of the low power nodes operate in the first connection mode exceeds the maximum supported one-to-one connection number, the part of the low power nodes that exceed the maximum supported one-to-one connection number operate in the second connection mode.

5. A Bluetooth mesh network system connection method having power management mechanism used in a Bluetooth mesh network system, comprising:

operating a part of a plurality of low power nodes in a first connection mode by a friend node, to establish a one-to-one connection with the friend node based on a connection protocol;

operating the other part of the low power nodes in a second connection mode by the friend node, to establish a multiple-to-one connection with the friend node based on a broadcast protocol; and setting a mode operation time threshold value for each of the low power nodes and accumulating a respective mode connection time for each of the low power nodes by the friend;

switching the low power nodes to operate in the other one of the first connection mode and the second connection mode when the mode connection time that the low power nodes operate in one of the first connection mode and the second connection mode reaches the corresponding mode operation time threshold value;

wherein an average power dissipation of each of the low power nodes is the same according to the mode operation time threshold value set by the friend node.

6. The Bluetooth mesh network system connection method of claim 5, wherein the first connection mode is to establish the one-to-one connection between the low power nodes and the friend node based on the connection protocol through a generic attribute profile bearer (GATT bearer), and the connection protocol is a proxy protocol;

the second connection mode is to establish the multiple-to-one connection between the low power nodes and the friend node based on the broadcast protocol through an advertising bearer.

7. The Bluetooth mesh network system connection method of claim 5, wherein a number of the low power nodes that is allowed to be operated in the first connection mode at the same time does not exceed a maximum supported one-to-one connection number of the friend node.

8. The Bluetooth mesh network system connection method of claim 7, further comprising:

operating the low power nodes in the first connection mode in an initialization stage by the friend node; and when a number of the low power nodes operate in the first connection mode exceeds the maximum supported one-to-one connection number, operating the part of the low power nodes that exceed the maximum supported one-to-one connection number in the second connection mode by the friend node.

\* \* \* \* \*